US012244836B2

(12) United States Patent
Suzuki et al.

(10) Patent No.: US 12,244,836 B2
(45) Date of Patent: Mar. 4, 2025

(54) DATA COMPRESSION PROCESSING SYSTEM AND DATA COMPRESSION PROCESSING METHOD

(71) Applicant: Hitachi, Ltd., Tokyo (JP)

(72) Inventors: Akifumi Suzuki, Tokyo (JP); Hiroaki Akutsu, Tokyo (JP); Masanori Takada, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 368 days.

(21) Appl. No.: 17/903,251

(22) Filed: Sep. 6, 2022

(65) Prior Publication Data

US 2023/0199205 A1 Jun. 22, 2023

(30) Foreign Application Priority Data

Dec. 16, 2021 (JP) .................................. 2021-203983

(51) Int. Cl.
*H04N 19/436* (2014.01)
*G06V 10/82* (2022.01)
(Continued)

(52) U.S. Cl.
CPC ........... *H04N 19/436* (2014.11); *G06V 10/82* (2022.01); *H04N 19/136* (2014.11); *H04N 19/157* (2014.11)

(58) Field of Classification Search
CPC .. H04N 19/436; H04N 19/136; H04N 19/157; H04N 19/103; H04N 19/17;
(Continued)

(56) References Cited

U.S. PATENT DOCUMENTS 5,850,527 A 12/1998 Suzuki
5,883,976 A 3/1999 Ohsawa
(Continued)

FOREIGN PATENT DOCUMENTS

JP 7-264092 A 10/1995
JP 8-186824 A 7/1996
(Continued)

OTHER PUBLICATIONS

Japanese Office Action received in corresponding Japanese Application No. 2021-203983 dated Dec. 26, 2023.

*Primary Examiner* — Michael S Osinski
(74) *Attorney, Agent, or Firm* — MATTINGLY & MALUR, PC

(57) ABSTRACT

A data compression processing system includes: a selection unit configured to select a compression processing setting to be applied to processing target data from among a plurality of compression processing settings; and a compression processing unit configured to compress the processing target data according to the compression processing setting selected by the selection unit. The selection unit is configured to: receive a condition required for compression processing of the processing target data; apply a plurality of compression processing settings applicable to the processing target data to evaluation data to perform compression processing; select, from the plurality of compression processing settings, a setting that satisfies the condition when applied to the processing target data based on a result of the compression processing for the evaluation data; and manage the selected compression processing setting in association with the condition.

12 Claims, 9 Drawing Sheets

(51) Int. Cl.
*H04N 19/136* (2014.01)
*H04N 19/157* (2014.01)

(58) Field of Classification Search
CPC ........ H04N 1/54; H04N 1/648; H04N 19/115;
H04N 19/12; G06V 10/82; G06V 20/35;
H03M 7/3059; H03M 7/46; H03M 7/607;
H03M 7/6082; H03M 7/6094
See application file for complete search history.

(56) References Cited

U.S. PATENT DOCUMENTS

| | | | |
|---|---|---|---|
| 5,987,181 A | 11/1999 | Makiyama et al. | |
| 6,031,939 A | 2/2000 | Gilbert et al. | |
| 7,533,398 B2* | 5/2009 | Cullinan | H04L 65/762 |
| | | | 709/219 |
| 11,582,442 B1* | 2/2023 | Fehervari | H04N 21/2187 |
| 2002/0194361 A1* | 12/2002 | Itoh | H04L 47/263 |
| | | | 709/224 |
| 2006/0179459 A1 | 8/2006 | Chiba | |
| 2010/0189351 A1* | 7/2010 | Mattausch | H04N 19/42 |
| | | | 382/173 |
| 2011/0075943 A1* | 3/2011 | Minami | H04N 19/12 |
| | | | 382/233 |
| 2011/0080950 A1 | 4/2011 | Toyota et al. | |
| 2015/0358632 A1* | 12/2015 | Chono | H04N 19/91 |
| | | | 382/233 |
| 2017/0264311 A1* | 9/2017 | Miyamae | H03M 7/3086 |
| 2017/0324958 A1* | 11/2017 | Tandon | H04N 19/625 |
| 2018/0338151 A1* | 11/2018 | Coulombe | H04N 19/136 |
| 2018/0367799 A1* | 12/2018 | Carmel | H04N 19/103 |
| 2019/0045195 A1* | 2/2019 | Gokhale | H04N 19/14 |
| 2019/0045210 A1* | 2/2019 | Guermazi | H04N 19/159 |
| 2020/0293885 A1* | 9/2020 | Yoshinaga | H03M 7/46 |
| 2021/0201073 A1* | 7/2021 | Zhao | G06F 18/23 |
| 2021/0274200 A1* | 9/2021 | Cismas | H04N 19/63 |
| 2021/0287404 A1* | 9/2021 | Chang | H04N 19/12 |
| 2021/0377541 A1* | 12/2021 | Henry | H04N 19/61 |
| 2021/0385499 A1* | 12/2021 | Zhang | H04N 19/70 |
| 2022/0109827 A1* | 4/2022 | Zhang | H04N 19/157 |
| 2022/0329807 A1* | 10/2022 | Xiao | H04N 19/91 |
| 2023/0023369 A1* | 1/2023 | Zheng | H04N 19/176 |
| 2023/0031924 A1* | 2/2023 | Sakai | H04N 1/648 |
| 2023/0078190 A1* | 3/2023 | Naccari | H04N 19/126 |
| | | | 382/232 |
| 2023/0162400 A1* | 5/2023 | Liu | H04N 19/188 |
| | | | 382/232 |
| 2023/0199192 A1* | 6/2023 | Bae | H04N 19/124 |
| | | | 375/240.08 |
| 2023/0199205 A1* | 6/2023 | Suzuki | H04N 19/136 |
| | | | 382/239 |
| 2023/0262236 A1* | 8/2023 | Kubota | H04N 19/17 |
| | | | 375/240.02 |
| 2023/0396787 A1* | 12/2023 | Jiang | H04N 19/436 |
| 2024/0121406 A1* | 4/2024 | Fitzgerald | H04L 65/762 |
| 2024/0163485 A1* | 5/2024 | Mohananchettiar | G06N 3/047 |
| 2024/0267532 A1* | 8/2024 | Zhernov | H04N 19/172 |
| 2024/0305796 A1* | 9/2024 | Browne | H04N 19/12 |
| 2024/0323384 A1* | 9/2024 | Zhang | H04N 19/93 |

FOREIGN PATENT DOCUMENTS

| | | |
|---|---|---|
| JP | 9-153815 A | 6/1997 |
| JP | 10-327403 A | 12/1998 |
| JP | 2006-217343 A | 8/2006 |
| JP | 2007-28646 A | 2/2007 |
| JP | 2011-82637 A | 4/2011 |
| JP | 2021-108041 A | 7/2021 |

* cited by examiner

FIG. 5

| COMP CONFIG INDEX | NEURAL NETWORK TYPE | DATA SIZE WEIGHT | LOSS FUNCTION | TRAIN DATA | RECOMPRESS JPEG OPTION |
|---|---|---|---|---|---|
| 0 | 1 | 10 | MS-SSIM | All | Quality 50 |
| 1 | 1 | 20 | MS-SSIM | All | Quality 55 |
| 2 | 1 | 30 | MS-SSIM | All | Quality 60 |
| 3 | 1 | 10 | MS-SSIM | All | Quality 55 |
| 4 | 1 | 20 | MS-SSIM | All | Quality 60 |
| 5 | 1 | 30 | MS-SSIM | All | Quality 65 |
| 6 | 1 | 10 | PSNR | All | Quality 50 |
| 7 | 1 | 20 | PSNR | All | Quality 55 |
| 8 | 1 | 30 | PSNR | All | Quality 60 |
| 9 | 1 | 10 | PSNR | Landscape | Quality 55 |
| 10 | 1 | 20 | PSNR | Landscape | Quality 60 |
| 11 | 1 | 30 | PSNR | Landscape | Quality 65 |
| 12 | 2 | 10 | PSNR | All | Quality 55 |
| 13 | 2 | 20 | PSNR | All | Quality 60 |
| 14 | 2 | 10 | NeuralNet | NeuralNet | Quality 65 |
| ⋮ | ⋮ | ⋮ | ⋮ | ⋮ | ⋮ |

FIG. 6

| DATASET TYPE INDEX 601 | REQUIRED COMPRESSION RATE 602 | WRITE TRANSFER TIME LIMIT 603 | READ TRANSFER TIME LIMIT 604 | USAGE 605 | IMAGE CONTENT 606 | ANALYSIS SERVER INFO 607 | JUDGEMENT CONDITION 608 | COMPRESSION CONFIG INDEX 609 |
|---|---|---|---|---|---|---|---|---|
| 0 | | | | | | | | |
| 1 | | | | | | | | |
| 2 | | | | | | | | |
| .. | .. | .. | .. | .. | .. | .. | .. | .. |

DATA COMPRESSION PROCESSING SYSTEM AND DATA COMPRESSION PROCESSING METHOD

CROSS-REFERENCE TO RELATED APPLICATION

The present application claims priority from Japanese application JP 2021-203983, filed on Dec. 16, 2021, the contents of which is hereby incorporated by reference into this application.

BACKGROUND OF THE INVENTION

1. Field of the Invention

The present invention relates to a data compression processing system and a data compression processing method.

2. Description of the Related Art

There is a technique of constructing reduction processing of the amount of data (hereinafter, it is referred to as compression processing) by a neural network and acquiring the reduction capability of the amount of data by learning. For example, JP 2021-108041 A describes "A transmitting device executes a first step of compressing a high quality image into a low quality image, a second step of generating a high quality image from the low quality image compressed using a prediction model, a third step of calculating an error between the high quality image before the compression processing and the high quality image after the high quality processing, a fourth step of executing relearning of the prediction model while varying a weighting parameter of the prediction model so that the error is equal to or less than a specified error, and a fifth step of transmitting the weighting parameter of the prediction model that is equal to or less than a specified error and the low quality image after the compression processing to a receiving device, and a receiving device executes a sixth step of updating the prediction model of the receiving device based on a weighting parameter acquired from the transmitting device, and a seventh step of generating a high quality image from the compressed low quality image by executing high quality processing using the updated prediction model". It is known that a learning-type compression/decompression device (hereinafter, it is simply referred to as a learning type compressor) constructed by such a neural network can convert the image quality into a high image quality with the same amount of data or an equivalent image quality with a small amount of data as compared with a compression technology such as JPEG.

SUMMARY OF THE INVENTION

The above-described learning type compressor acquires data compression processing through learning. In this learning, the lossy compression method according to the usage is automatically acquired by changing the learning data and the loss function as a target of learning. For example, by setting a function that simulates human perception or a neural network that expresses human perception as a loss function, it is possible to obtain an image lossy compression system suitable for a usage mainly watched by a person. Alternatively, a lossy compression system suitable for image analysis can be acquired simply by setting a function representing a difference in value from each pixel of the original image.

As described above, the learning type compressor has a wide variety of settings, and various types of learning type compressors can be created.

The compression setting of the image data to be analyzed is determined based on whether an image deteriorated by compression/expansion is available in the analysis software. In general, it is desirable to set compression with the smallest data in image quality available in analysis software. In a case where the analysis software is complicated, for example, in a case where analysis such as structure from motion (SfM) is performed, it is difficult to determine whether the analysis software can be used even by using an evaluation value by an image quality evaluation index such as a peak signal-to-noise ratio (PSNR) or a multi-scale structural similarity (MS-SSIM). Therefore, in order to determine an appropriate compression setting of an image to be analyzed by certain analysis software, it is necessary to make a determination after actually executing the analysis software and acquiring an analysis result. The analysis time by such analysis software requires a unit of several tens of minutes to several hours.

As described above, while an analysis time is required to determine an appropriate compression setting, there are several tens to several hundreds of compression settings of the learning type compressor, and an enormous amount of time is required to evaluate all the compression settings and determine an optimum setting.

In order to achieve the above object, a representative data compression processing system of the present invention includes: a selection unit configured to select a compression processing setting to be applied to processing target data from among a plurality of compression processing settings; and a compression processing unit configured to compress the processing target data according to the compression processing setting selected by the selection unit. The selection unit is configured to: receive a condition required for compression processing of the processing target data; apply a plurality of compression processing settings applicable to the processing target data to evaluation data to perform compression processing; select, from the plurality of compression processing settings, a setting that satisfies the condition when applied to the processing target data based on a result of the compression processing for the evaluation data; and manage the selected compression processing setting in association with the condition. The compression processing unit is configured to: compress, when the condition is designated, the processing target data according to a compression processing setting managed in association with the condition.

One typical data compression processing method of the present invention includes: selecting a compression processing setting to be applied to processing target data from among a plurality of compression processing settings; and compressing the processing target data according to the compression processing setting selected in the selection step. The selecting includes: receiving a condition required for compression processing of the processing target data; applying a plurality of compression processing settings applicable to the processing target data to evaluation data to perform compression processing; selecting, from the plurality of compression processing settings, a setting that satisfies the condition when applied to the processing target data based on a result of the compression processing for the evaluation data; and managing the selected compression processing setting in association with the condition. The compressing includes: compressing, when the condition is designated, the processing target data according to a compression processing setting managed in association with the condition.

According to the present invention, it is possible to efficiently specify the compression processing setting suitable for the processing target data.

BRIEF DESCRIPTION OF THE DRAWINGS

FIG. 5 is a diagram illustrating compression setting management information in the first embodiment;

FIG. 6 is a diagram illustrating data set management information in the first embodiment;

DESCRIPTION OF THE PREFERRED EMBODIMENTS

Hereinafter, embodiments will be described using the drawings. The present invention is not limited to the embodiments described below.

First Embodiment (1-1) System Configuration

Figure 1:
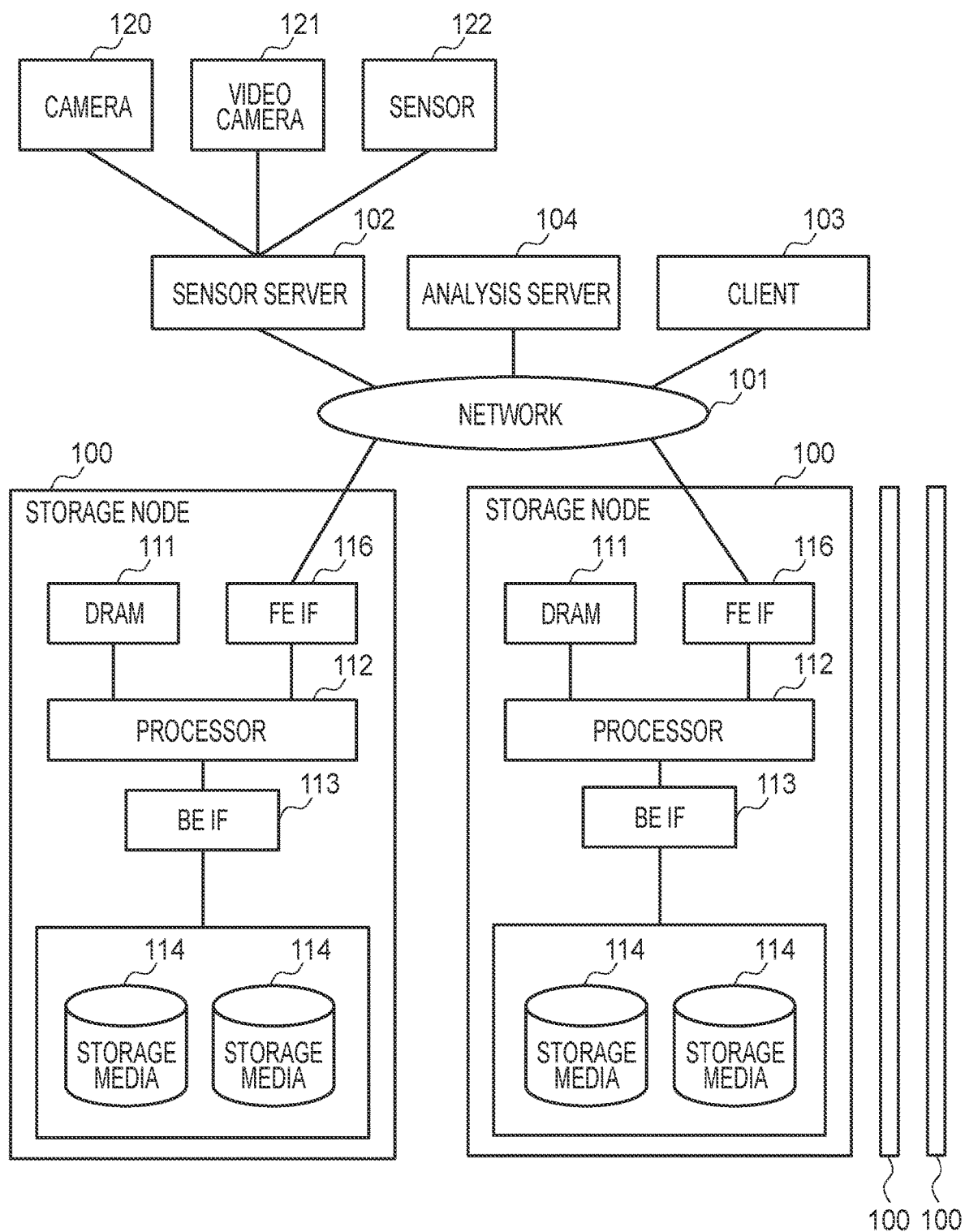
FIG. 1 is a system configuration diagram according to a first embodiment.

First, an example of a system configuration to which the present invention is applied will be described using FIG. 1. FIG. 1 illustrates an outline of a system example to which the present invention is applied, and the present invention is applicable to a system using FIG. 1 as an example.

FIG. 1 illustrates a system including a storage system including a plurality of storage nodes 100, a sensor server 102, a client server 103, and an analysis server 104.

FIG. 1 illustrates a storage node configuration to which the present invention is applied. The storage node 100 in FIG. 1 includes a DRAM 111 as a primary storage area, a processor 112 that performs various processes in accordance with software, a back-end interface 113 connected to a storage media, a storage media 114 as a secondary storage area, and a network interface 116 connected to another server.

The DRAM 111 is connected to the processor 112 by a connection accessible from the processor 112 in a short time, and is an area for storing a program to be processed by the processor 112 and processing target data.

The processor 112 is an apparatus that operates according to a program and processes target data. The processor 112 has a plurality of processor cores therein, and the processor cores process programs independently or in cooperation with each other. The processor 112 has a DRAM controller therein, and acquires data from the DRAM 112 or stores data in the DRAM 112 in response to a request from the processor. The processor 112 has an external IO interface and is connected to the back-end interface 113. It is possible to notify the storage media 114, which is a secondary storage device, of an instruction via the back-end interface 113. The processor 112 performs various processes related to the compression/expansion of the sensor data, which will be described later.

In the processor 112, storage related software such as a software defined storage (SDS) or a database (DB) operates in addition to the data compression/expansion processing, and after compressing the received sensor data, the compression data is distributed and stored in a node group including a plurality of storage nodes 100. At this time, the processor 112 performs control to record data in the storage media 114 according to the control of the SDS or the DB.

The back-end interface 113 is an interface for communicating with a storage media such as Serial ATA (SATA) or Serial Attached SCSI (SAS). At the time of writing, the back-end interface 113 acquires write target data from the DRAM 111 and transfers the write target data to the storage media 114 on the basis of an instruction from the processor 112. At the time of reading, read target data is acquired from the storage media 114 and transferred to the DRAM 111 on the basis of an instruction from the processor 112. In the present embodiment, an example in which the back-end interface 113 exists independently of the storage media 114 will be described, but the present invention is not limited to this example. An interface directly instructed from the processor 112, for example, NVMe (Non-Volatile Memory Host Controller Interface) may be mounted in the storage media 114.

The storage media 114 is a secondary storage device that stores analysis target data. In the present invention, the storage media 114 receives and permanently stores the write data transmitted from the back-end interface controlled by the processor 112.

The network interface included in the sensor server 102 is an interface for connecting between the storage nodes 100 and a network connected to the sensor server 102. In the example of FIG. 1, the storage node 100 communicates with other storage nodes using the network 101.

In FIG. 1, there is the sensor server 102 connected to the storage node 100 via the network 101. The sensor server 102 manages a sensor group including a video camera 121, a still image camera 120, and a sensor 122, and transfers sensor data (including moving image and still image) measured by the sensor to the storage node 100 via the network 101. At this time, the sensor server 102 may perform compression to reduce the amount of data and then transfer the data to the storage node 100, or may transfer the data to the storage node 100 without compression. In a case where the sensor data is transferred to the storage node 100 without compression, the storage node 100 that has received the sensor data from the sensor server 102 compresses and stores the sensor data by using compression processing to be described later under the control of the processor 112.

The client server 103 is a terminal used when the user uses the sensor data stored in the storage node 100, and requests the sensor data from the storage node 100. The storage node 100 that has received the request from the client server 103 decompresses the sensor data held in the compressed format by the decompression processing to be described later under the control of the processor 112, and if necessary, decompresses and recompresses the sensor data into a different compression format (JPEG), and transfers the data to the client server 103 or the analysis server 104 to be described later. In a case where the compression data is decompressed by the analysis server 104, the storage node 100 that has received the request from the client server 103 transfers the data compressed by the control of the processor 112 to the client server 103 or the analysis server 104 to be described later.

The analysis server 104 issues a read request to the storage node 100 and acquires data in order for the user to analyze the sensor data stored in the storage node 100. Alternatively, data is recorded from the storage node 100 in a Write request. In a case where the compression data is not decompressed in the storage node 100, the compression data acquired or received from the storage node 100 is decompressed.

The system configuration of the present embodiment in FIG. 1 has been described above. In the present embodiment, an example implemented in the storage node 100 illustrated in FIG. 1 will be described, but the present invention is not limited to this example. For example, the sensor server 102 may have processing resources equivalent to those of the storage node and perform compression processing to which the present invention is applied. In the present embodiment, an example in which the processor of the storage node processes the compression processing and the decompression processing is described, but the present invention is not limited to this example, and a GPU, an FPGA, or the like may be mounted on the storage node, and the compression processing and the decompression processing may be performed by processing resources such as the GPU and the FPGA.

(1-2) Compression Setting Management Information

In the present embodiment, compression of a still image will be described as an example.

There are a plurality of compression setting items managed by the system in the present embodiment, and the compression setting management information is managed for the purpose of managing the plurality of setting items. Basically, a plurality of compression settings are mounted in an initial state, but the compression settings may be added or updated during operation of the apparatus. In the compression setting management information of the present embodiment, the same information is shared in synchronization among the sensor server 102 that may perform compression, the analysis server 104 that may perform decompression, and the storage node 100 that may perform compression and decompression. Therefore, when the compression setting management information of a certain device is updated, the compression processing and decompression processing are not performed until the update information is synchronized.

The compression setting management information of the present embodiment will be described with reference to FIG. 5. There are five items in the compression setting management information of the present embodiment, and the compression setting management information includes a compression setting index 501, a neural network type 502, a data size weight 503, a loss function 504, learning data 505, and a recompression JPEG setting 506.

The compression setting index 501 is a field for storing an index for managing compression settings. By using the value of this index at the time of compression or decompression, the system acquires information of the neural network type 502, the data size weight 503, the loss function 504, the learning data 505, and the recompression JPEG setting 506 from the compression setting management information.

The neural network type 502 is a field for storing the type of neural network that performs compression and expansion. In a learning type compressor, processing time of compression and decompression changes depending on a neural network type, and data reduction capability also changes. In general, a compressor having fewer elements of a neural network has a processing time shorter than that of compression using a huge neural network. The image quality of a compressor having fewer elements of a neural network is lower than that of a compressor using a huge neural network when data is reduced to the same data size and compared.

The data size weight 503 is a weight of the data size used at the time of preliminary learning of the neural network designated by the neural network type 502. The neural network of the present embodiment performs learning so as to minimize the total value of the polynomial expression "weight of data size×data size+value of loss function" at the time of preliminary learning. In this polynomial, as the weight of the data size increases, the ratio of the data size to the total value of the polynomial increases. Therefore, learning is performed with emphasis on reduction of the data size, and a neural network in which reduction of the data size is prioritized over the value of the loss function (generally, image quality) is generated. As a result, in the same loss function and the same neural network type, as the weight of the data size increases, the compression rate improves (the data size after compression decreases), and the image quality decreases (the value of the loss function does not decrease). In the present embodiment, a plurality of learned compressors having different weights of the data size with the same loss function are mounted in the same neural network type, and a specific compressor is selected and used according to the value of the weight of the data size in the compression setting.

The loss function 504 is a loss function used when a neural network constituting the learning type compressor is learned. As described above, the compressor of the present embodiment is learned so as to minimize the value of the expression "weight of data size×data size +value of loss function". By changing this loss function, it is possible to create a compressor specialized for various usages. The usage is, for example, "used by a person" or "processed by specific analysis software". In the case of being viewed and used by a person, unlike the case of being processed by software, there are few cases where a place that a person cannot recognize in an image becomes a problem even if the image is changed. The number of loss functions of the present embodiment does not need to be one. Even a plurality of loss functions can be added to the polynomial at the time of learning to create a compressor balanced for a plurality of usages. The loss function may be a neural network. For example, there is a neural network that simulates an image quality score given when a person views an image. Such a neural network may be used as a loss function. As described above, the learning type compressor changes the compression system by changing the loss function, and there are many loss functions, so that compressors with different compression settings can be easily created.

The learning data 505 is a field for storing a data set used for learning the neural network. The neural network can improve the data reduction effect only for a specific image by learning only the specific image. For example, in the case of a compressor that compresses an image of a landscape, it is possible to improve the compression rate by learning the compressor with a data set having many scenes as compared with learning with a miscellaneous data set.

The recompression JPEG setting 506 is a field necessary when the analysis software does not support the compression format of the learning type compressor and supports only JPEG in the system according to the present embodiment. When the analysis software can analyze only JPEG, the system once decompresses the image compressed by the learning type compressor. Then, the decompressed data is compressed by JPEG. At this time, since JPEG is lossy compression, the image is further deteriorated in addition to being deteriorated when compressed by the learning type compressor. In this JPEG setting, it is desirable not to lower the image quality, but since the data size is increased, there is a possibility that the read performance of the storage is lowered. In the present embodiment, an example in which the recompression is JPEG is described, but the present invention is not limited to this example, and other lossy compression formats may be used. When the analysis software supports a compressed file of the learning type compressor, JPEG recompression is not necessary. In this case, the compression setting is managed in the compression setting management information as the compression setting in which the JPEG recompression is not performed. An example of the value stored in the JPEG recompression is a quality value that can be designated during JPEG compression.

In the present embodiment, a combination of these four items of the compression management information, the neural network type 502, the data size weight 503, the loss function 504, and the recompression JPEG setting 506 is referred to as compression setting, and is managed by the compression setting index 501. As described above, the compression setting is a combination of a plurality of settings, and the combination produces several tens to several hundreds of compression settings.

(1-3) Write Data Flow

An outline of a write data flow to the storage node 100 in the present embodiment will be described with reference to FIG. 2.

Figure 2:
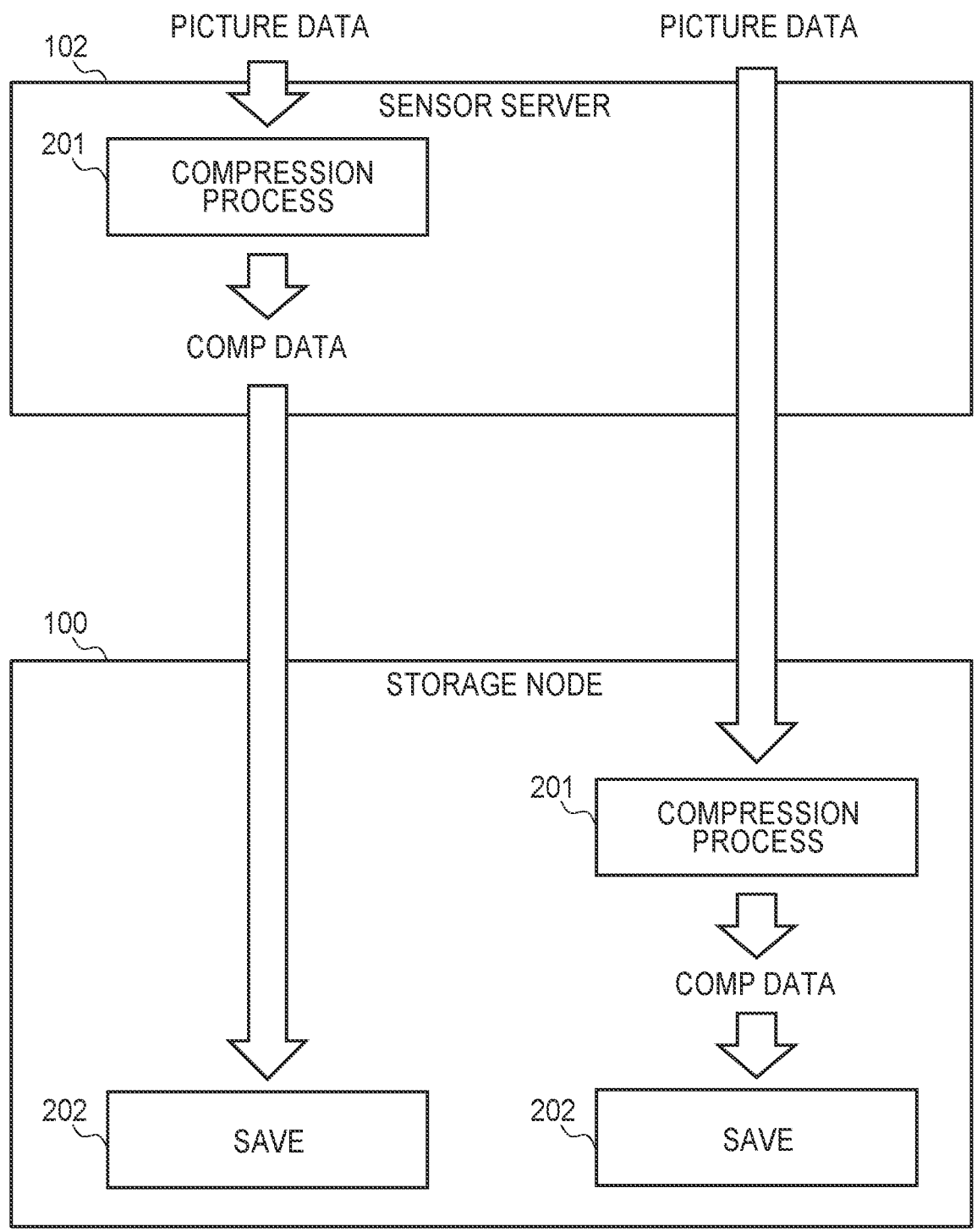
FIG. 2 is a diagram illustrating a write data flow in the first embodiment.

FIG. 2 is a write data flow in the present embodiment. A data flow when an image obtained by a camera 120 or the like is acquired with respect to the sensor server 102 is illustrated. The data flow of the compression of the present embodiment corresponds to a system in which data is compressed by the sensor server 102 and then transferred to the storage node 100 and a system in which an image measured by the sensor server 102 is directly transferred to the storage node 100.

In a case where compression is performed in the sensor server 102, a compression process 201 is performed in the sensor server 102, and data is reduced and then transferred to the storage node 100. Therefore, when the network speed between the sensor server 102 and the storage node 100 is low, the transfer time can be shortened. On the other hand, in a case where the sensor server 102 transfers the data to the storage node 100 without performing compression, it is not necessary to perform the compression processing in the sensor server 102, and thus, it is possible to lower the price or the like of the sensor server 102. In this case, the storage node 100 performs the compression process 201 in the present embodiment. The selection of the transfer can be set by the user.

In the compression process 201, software operating in a processor of the sensor server 102 or the storage node 100 acquires a value of an associated compression setting index from the data set management information to be described later using a designated data set type index. Next, the processor acquires the compression setting associated with the compression setting index by using the compression setting management information, and performs the compression processing with the compression setting. When the captured image data is compressed instead of the RAW format, the processor decompresses the compression to generate RAW data. Then, the RAW data is input to a learning type compressor constituted by a neural network designated by the acquired compression setting to generate compression data.

Storage processing 202 is performed on the compressed data in the storage node 100. At this time, storage software operating in the storage node 100 redundantly records the data so that the compression data is not lost.

The above is the data flow of compression in the present embodiment.

(1-4) Read Data Flow

Figure 3:
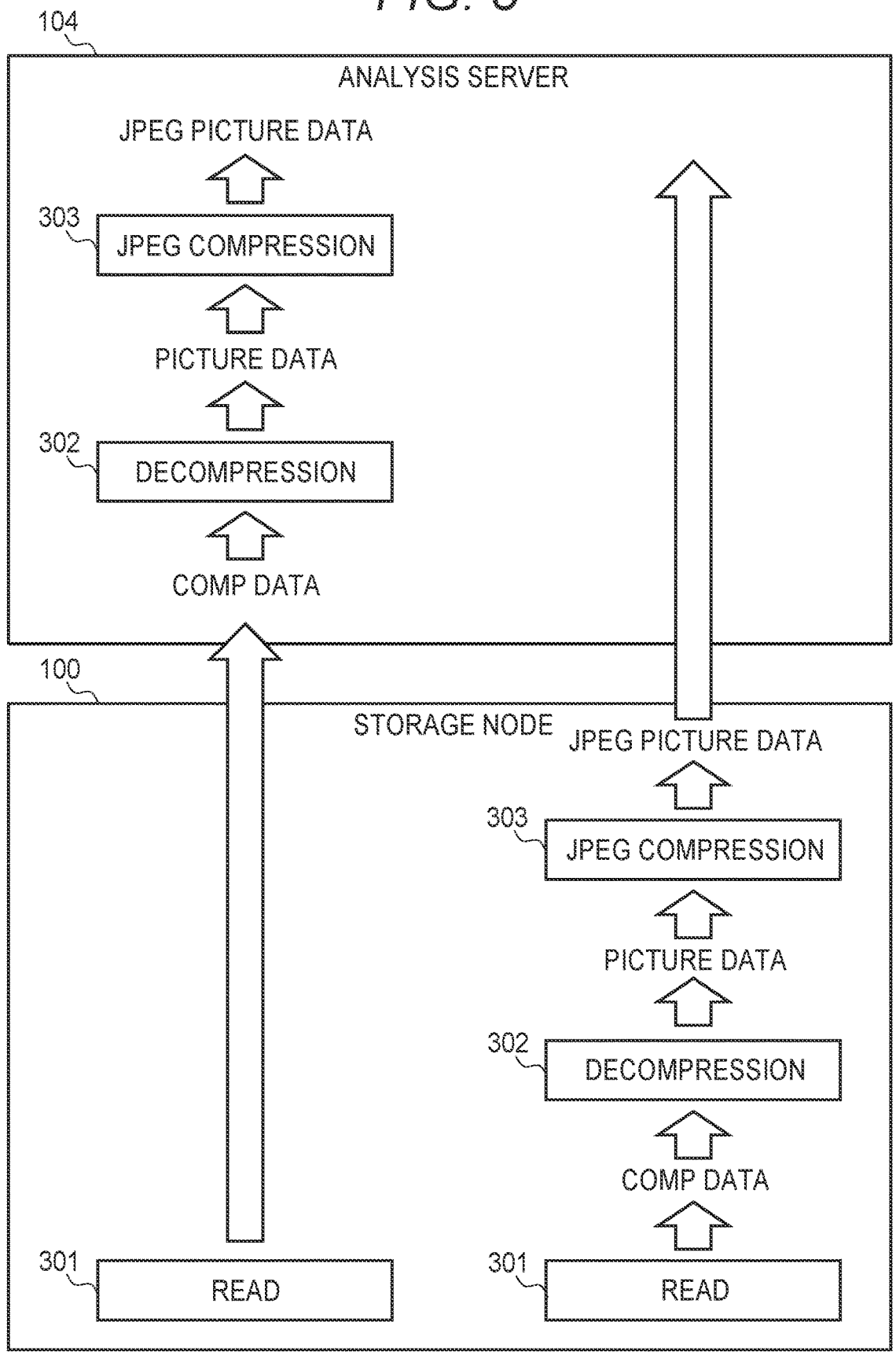
FIG. 3 is a diagram illustrating a read data flow in the first embodiment.

An outline of a read data flow for the storage node in the present embodiment will be described with reference to FIG. 3. FIG. 3 is a read data flow in the present embodiment. This data flow is started when the analysis server 104 issues a read request to compression data of an image stored in the storage node 100. In this operation, the storage node 100 executes read processing 301 of the stored compression data. The system according to the present embodiment supports two systems: a system of transferring the read compression data to the analysis server 104 as it is; and a system of performing decompression processing 302 in the storage node and performing JPEG recompression processing 303 if necessary. Selection of the system is settable by the user. When the read data is directly transferred to the analysis server 104, the analysis server 104 performs the decompression processing 302, and if necessary, performs the JPEG recompression processing 303.

The decompression processing 302 is a process performed by software operating in the processor of the storage node 100 or the analysis server 104, acquires the value of a compression setting index 402 recorded in a compressed file 400, and performs the decompression processing according to the compression setting associated with the value of the compression setting index 402. More specifically, the compression data is decompressed by the neural network type 502 described in the compression setting.

When the value of JPEG recompression is recorded in the compression setting associated with compression setting index 402, the JPEG recompression processing 303 is performed. In the JPEG recompression processing 303, decompressed data that is an output of the decompression processing 302 is recompressed by JPEG based on a setting value of the JPEG recompression in the compression settings.

The above is the data flow of the decompression in the present embodiment.

(1-5) Compressed File

Figure 4:
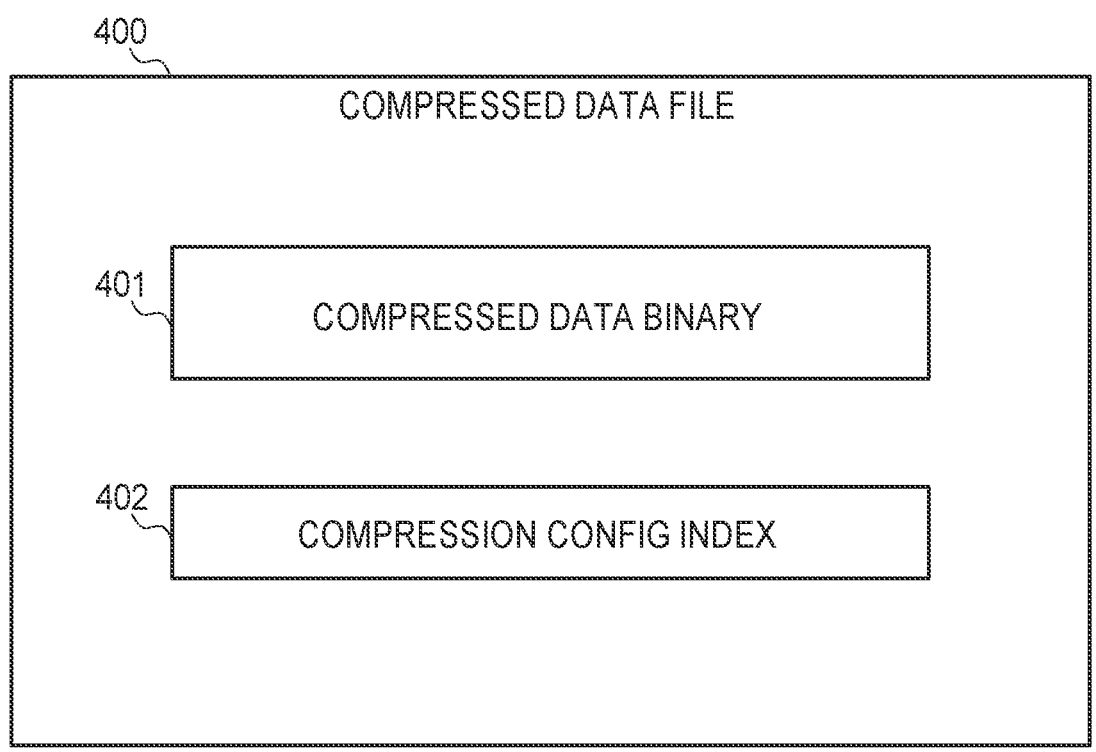
FIG. 4 is a diagram illustrating contents of a compressed file in the first embodiment.

Next, the compressed file in the present embodiment will be described. FIG. 4 is an explanatory diagram of contents of a compressed file. The compressed file 400 of the present embodiment internally stores values of a compressed data binary 401 and the compression setting index 402.

The compressed data binary 401 is data obtained by compressing image data with a learning type compressor.

The compression setting index 402 is a compression setting index number indicating a compression setting used at the time of compression in the compression process 201.

(1-6) Data Set Management Information

Next, the data set management information in the present embodiment will be described. FIG. 6 is an explanatory diagram of the data set management information of the embodiment.

In the system of the present embodiment, various image data sets are compressed and stored and analyzed by analysis software. Then, the compression setting desired by the user is different for each data set type, and the user cannot determine which compression setting can be kept within an allowable error range by the analysis of the analysis software. Therefore, the user inputs the use condition for each data set type. Then, the system of the present embodiment selects a plurality of compression settings that satisfy the use conditions as "compression setting candidates". Next, the system generates a degradation evaluation image data set for determining whether the compression setting candidate can be used by designated analysis software. Then, when the available compression setting is determined by the evaluation, the compression setting is held. The data set management information manages the relationship between the data set and the compression setting.

The data set management information includes fields of a data set type index 601, a required compression rate 602, a write transfer time upper limit 603, a read transfer time upper limit 604, a usage 605, an image content 606, analysis server information 607, a determination condition 608, and a compression setting index 609.

The data set type index 601 is a field for managing an index for each data set. In the system of the present embodiment, the data set is registered in the system when the user searches for the compression setting for each data set. Here, the search for the compression setting is a process of searching for and selecting the compression processing setting to be applied to the processing target data at the time of operation from a plurality of compression processing settings.

The required compression rate 602 is a field for storing a compression rate desired by the user for the data set. The user inputs a value of this field through a user interface described below.

The write transfer time upper limit 603 is a field for inputting a write time to the storage node 100 desired by the user for the data set. In addition to the time, the field also stores a search policy in which it is desired to be as small as possible, or if it is less than or equal to the time specified in the field, it is not searched even if there is a compression setting that can be shortened. A policy such as not including the write transfer time in the search condition is also stored. The user inputs a value of this field through a user interface described below.

The read transfer time upper limit 604 is a field for inputting a read time from the storage node 100 desired by the user for the data set. In addition to the time, the field also stores a search policy in which it is desired to be as small as possible, or if it is less than or equal to the time specified in the field, it is not searched even if there is a compression setting that can be shortened. A policy such as not including the read transfer time in the search condition is also stored. The user inputs a value of this field through a user interface described below.

The usage 605 is a field for storing the usage intended by the user for the data set. When the user inputs a usage such as "human visual observation", "data analysis", or "human visual observation +data analysis" for this data set, the system of the present embodiment selects a suitable compression setting according to this input value and creates a compression setting candidate. In the present embodiment, what is set as "human visual observation" learns a neural network (Learned Perceptual Image Patch Similarity (LPIPS) and Deep Image Structure and Texture Similarity (DISTS)) that simulates an image quality score by human perception as a loss function. What is designated as "data analysis" learns PSNR as a loss function. What is set as "human visual observation+data analysis" learns, as a loss function, MS-SSIM or a total value of PSNR and a Newnet simulating an image quality score by human perception. The present invention is not limited to these examples of the loss function. The user inputs a value of this field through a user interface described below.

The image content 606 is a field indicating a category of the image content of the data set. The category of the image content includes "photograph landscape", "photograph person", "photograph aerial image", "photograph unclassifiable", "illustration", and the like, and the type designated by the user is stored. In the present embodiment, at the time of compression setting selection processing to be described later, a compressor having the same category of learning data in the image content and the compression setting is preferentially selected using this value.

The analysis server information 607 is a field in which information necessary for evaluating the evaluation data set of the data set by the analysis server is recorded. In the present embodiment, in the compression setting evaluation processing to be described later, whether an error caused by analysis of analysis software operating on the analysis server falls within a range acceptable to the user is evaluated individually for a plurality of compression settings selected as compression setting candidates. Therefore, the degradation evaluation data is transferred to the analysis server, and the analysis software is activated to perform the analysis processing. Therefore, the analysis server information stores an IP address of the analysis server, an ID and a password necessary for login, an analysis script for operating the analysis software, and the like. In the present embodiment, feature point extraction software (AKAZE or the like) for an image is used as an example of analysis software for description. As the evaluation data that is a source of the degradation evaluation data, data similar to data to be compressed by the user is used. For example, in a case where the user compresses image data for detecting a crack of a road, the image data used for the same usage among data accumulated in the past is used as evaluation data. The evaluation data needs to be able to be analyzed by analysis software in S802 of the compression setting evaluation processing to be described later.

The determination condition 608 is a field for storing a condition for determining whether the compression setting to be evaluated is available in the compression setting evaluation processing to be described later. When the image of the data set is degraded by compression, the result of the analysis software changes. Whether the compression setting is available is determined by whether the width of this change is acceptable. In the present embodiment, the feature point extraction software is taken as an example as described above, and in the present embodiment, as an example of a determination method in this case, an image group of a data set before compression and a data set deteriorated by compression is input to the feature point extraction software, each feature point is obtained, and then an average value of change amounts (Chamfer Distance and the like) of coordinates of the feature points is used. Then, it is determined that a compression setting in which the average value is equal to or less than a certain threshold value is available. Therefore, in the field of the determination condition 608 of the present embodiment, a script describing determination processing (calculation of the change amount) and a threshold value are possible. An example in which a change in coordinates of a feature point when an image is compressed is used as a determination condition has been described, but the present invention is not limited to this example. For example, an average value of square errors of the pixels of the original image and the compressed image may be used for determination, and the average value may be equal to or less than a certain threshold value.

The compression setting index 609 is a field that stores a value of a compression setting index of a suitable compression setting determined in the compression setting evaluation processing to be described later for the data set.

In the system of the present embodiment, the data set management information is managed in synchronization in the sensor server 102 and the storage node 100, and in the compression process 201 at the time of writing to the storage node, the value of the compression setting index associated with the data set is acquired in the sensor server 102 or the storage node 100, and the compression processing is performed.

(1-7) Compression Setting Candidate Selection Processing

Figure 7:
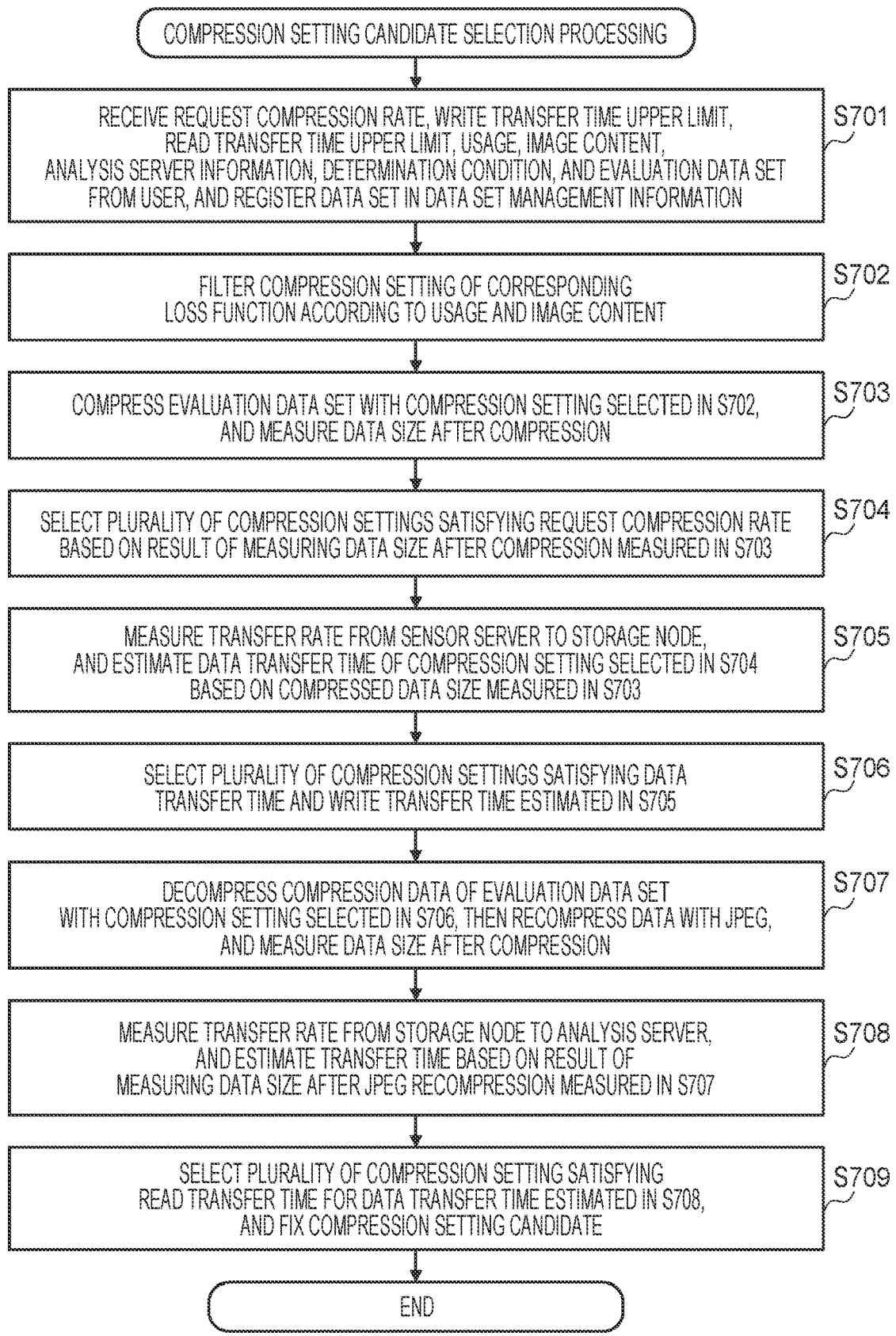
FIG. 7 is a diagram illustrating compression setting candidate selection processing in the first embodiment.

Next, compression setting candidate selection processing in the present embodiment will be described with reference to FIG. 7. FIG. 7 is a diagram illustrating steps of the compression setting candidate selection processing. The compression setting candidate selection processing is a step that operates when the user registers the data set type using a user interface to be described later displayed on the client server 103. Although the compression setting candidate selection processing in the present embodiment is performed by the storage node 100, the present invention is not limited to this example. For example, the compression setting candidate selection processing may be performed by the sensor server 102.

First Step S701 of the compression setting candidate selection processing is a process in which the storage node 100 receives various types of information input by the user. The storage node 100 receives a required compression rate, a write transfer time upper limit, a read transfer time upper limit, a usage, and an evaluation data set from a user. Then, the storage node 100 registers the required compression rate, the write transfer time upper limit, the read transfer time upper limit, the usage, the analysis server information, and the determination condition in the data set management information managed by itself, and acquires the data set type index indicating the registered row.

In Step S702 subsequent to Step S701, the compression setting of the loss function matching the usage is selected from the various compression settings registered in the compression setting index 501 managed by the corresponding storage node using the "usage" acquired from the user in Step S701. The relationship between the usage and the loss function has been described in the description of the usage in the data set management information described above, and thus is omitted. The compression setting matching the "learning data 505" is selected from the various compression settings registered in the compression setting index 501 managed by the corresponding storage node using the "image content" acquired from the user in Step S701. If there is no matched compression setting, the compression setting in which the learning data 505 is the entire image is selected.

In Step S703 subsequent to Step S702, the evaluation data set received from the user in Step S701 is compressed using all of the plurality of compression settings selected in Step S702, and the compressed data size is measured. At this time, in a case where there is a compression setting in which "neural network type", "weight of data size", and "loss function", which are contents of the compression setting, are the same (only JPEG recompression setting is different), only one compression setting is performed while avoiding duplication.

In Step S704 subsequent to Step S703, the compression rate (data size after compression÷data size before compression) is calculated on the basis of the data size in each compression setting acquired in Step S703, and only the compression setting satisfying the required compression rate acquired from the user (compression rate<required compression rate) is selected in Step S701.

In Step S705 subsequent to Step S704, the storage node 100 requests the sensor server 102 to perform processing of transferring sample data from the sensor server 102 to the storage node 100, and the data transfer rate from the sensor server 102 to the storage node 100 is measured. Then, the time for transferring the compression data for each compression setting from the sensor server 102 to the storage node 100 is estimated using the compressed data size of the evaluation data set measured in Step S703. In a case where the data is transferred from the sensor server 102 to the storage node 100 without being compressed, since the compression by the learning type compressor is performed in the storage node 100, this step is skipped since it does not affect the transfer time at the time of Write.

In Step S706 subsequent to Step S705, only the compression setting in which the transfer time from the sensor server 102 to the storage node 100 estimated in Step S705 is less than the write transfer time upper limit received in Step S701 is selected.

In Step S707 subsequent to Step S706, the evaluation data set received from the user in Step S701 is compressed and expanded using all of the plurality of compression settings selected in Step S706, and an image recompressed by JPEG is generated. Then, the data size of JPEG of the data set generated by the recompression is measured.

In Step S708 subsequent to Step S707, the storage node 100 performs a process of transferring sample data to the analysis server 104, and measures a transfer rate when the data is transferred from the storage node 100 to the analysis server 104. Then, the data transfer time from the storage node 100 to the analysis server 104 is estimated based on the transfer rate and the data size of the recompressed JPEG calculated in Step S707. In a case where the compression data is transmitted from the storage node 100 to the analysis server 104 and the analysis server 104 performs decompression and JPEG recompression, this step is skipped.

In Step S709 subsequent to Step S708, only the compression setting in which the transfer time from the storage node 100 to the analysis server 104 estimated in Step S708 is less than the read transfer time upper limit received in Step S701 is selected. Through this process, the compression setting candidates of the present embodiment are determined.

The above is the compression setting candidate selection processing in the present embodiment. After this process, the process proceeds to the compression setting evaluation processing.

(1-8) Compression Setting Evaluation Processing

Figure 8:
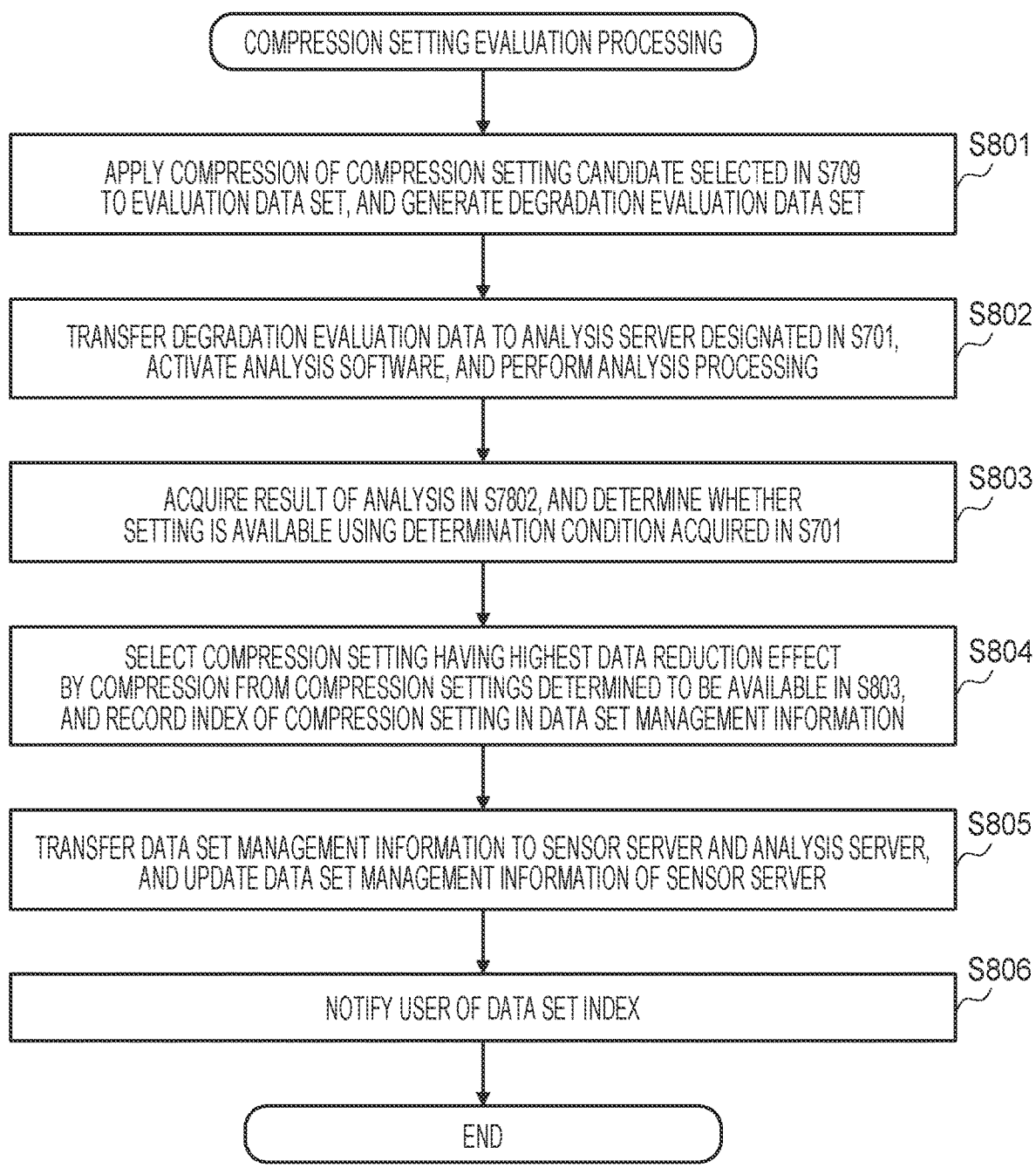
FIG. 8 is a diagram illustrating a compression setting evaluation processing in the first embodiment.

Next, the compression setting evaluation processing in the present embodiment will be described with reference to FIG. 8. The compression setting evaluation processing of the present embodiment is started after the compression setting candidate selection processing.

In the first Step S801 of the compression setting evaluation processing of the present embodiment, the storage node 100 compresses the evaluation data acquired in Step S701 with all the compression settings that are the compression setting candidates in Step S709, and generates the degradation evaluation data. When the data generated in Step S708 remains, the data may be used as the degradation evaluation data without being compressed.

In Step S802 subsequent to Step S801, the storage node 100 transfers the degradation evaluation data created in Step S801 to the analysis server of the IP address described in the analysis server information 607 acquired in Step S701.

Then, an analysis script for operating the analysis software described in the analysis server information is executed to acquire an analysis result.

Step S803 subsequent to Step S802 is a step in which the storage node 100 uses the analysis result of the degradation evaluation data by each compression setting acquired in Step S802 and the determination condition acquired from the user in Step S701 to evaluate whether each compression setting is available. In this step, information necessary for determination is extracted from the analysis result (for example, a difference from the original data) and compared with a determination condition (for example, magnitude comparison with a threshold). Whether the compression setting can be used is determined based on whether the determination condition is satisfied.

In Step S804 subsequent to Step S803, the storage node 100 selects the compression setting having the highest data reduction effect from the compression settings determined to be utilizable in Step S803. More specifically, the compression setting having the smallest data amount in the compressed data size acquired in Step S703 is selected. Then, with reference to the data set management information, the value of the compression setting index specifying the selected compression setting is recorded and updated in the field of the compression setting index in the data set management information.

In Step S805 subsequent to Step S804, the storage node 100 transfers the data set management information updated in Step S804 to the sensor server 102 and the analysis server 104 that actually perform the compression processing, and updates and synchronizes the data set management information of the sensor server 102 and the analysis server 104. By this processing, the user can subsequently perform data compression with an appropriate compression setting on the data set by the sensor server 102.

In Step S806, the user who has registered the data set from Step S701 is notified of the completion of the registration of the data set and the data set type index of the registered data set. The user who has received the data set type index can perform compression with an appropriate compression setting associated with the data set type index by specifying the data set type index at the time of data compression.

The above is the compression setting evaluation processing in the present embodiment.

(1-9) User Interface

Figure 9:
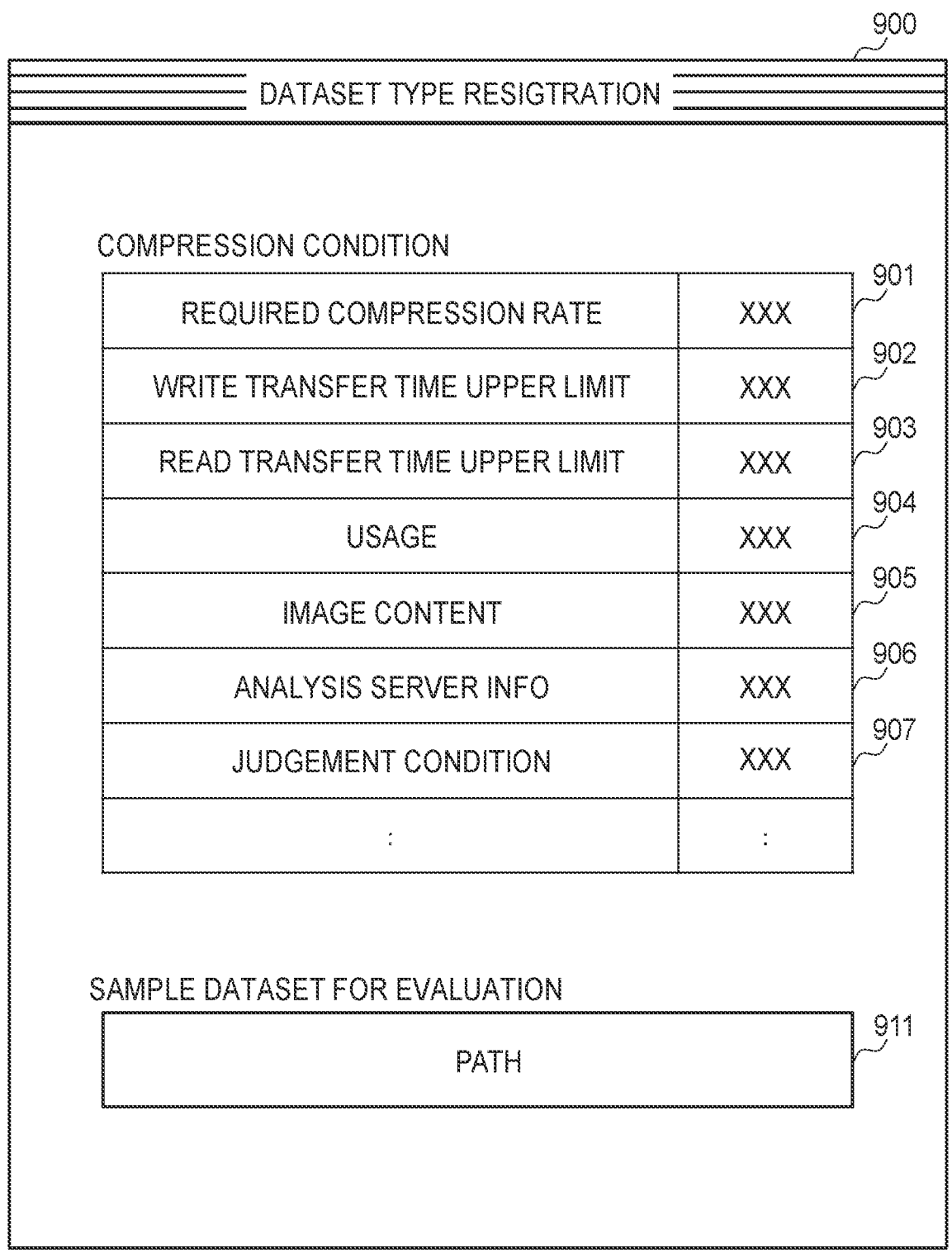
FIG. 9 is a diagram illustrating a user interface screen in the first embodiment.

Next, a user interface in the present embodiment will be described with reference to FIG. 9.

A user interface screen 900 shows an example of a graphical user interface screen for the user to make settings.

The user interface screen 900 according to the present embodiment is a screen displayed by the storage node 100 or the client server 103 connected to the storage node 100 via the network 101, and includes fields for inputting a required compression rate 901, a write transfer time upper limit 902, a read transfer time upper limit 903, a usage 904, an image content 905, analysis server information 906, and a determination condition 907 as a data set type compression condition. In order to send the evaluation data set to the storage node 100, the evaluation data set is configured to include a path field 911 of the evaluation data set.

The required compression rate 901, the write transfer time upper limit 902, the read transfer time upper limit 903, the usage 904, the image content 905, the analysis server information 906, and the determination condition 907 are all information stored in data set management information 600 described above. The user inputs each item according to the use condition.

The path field 911 of the evaluation data set is used to transfer the evaluation data set to the storage node, and is a field for specifying a path of the directory in which the evaluation data set is stored.

The above is the user interface in the present embodiment.

As described above, in the system of the present embodiment, the user uses the user interface screen 900 to input the data set type, the compression condition when using the data set type, and the evaluation data for evaluating the data set type, and registers the data set type in the storage node 100. The storage node 100 refers to the compression condition in the data set type input by the user, and searches for a compression setting that satisfies the condition.

As described above, the data compression processing system of the disclosure includes: the storage node 100 that functions as a selection unit that selects the compression processing setting to be applied to the processing target data from among the plurality of compression processing settings; and a compression processing unit that compresses the processing target data according to the selected compression processing setting. The compression processing unit may be the sensor server 102 or the storage node 100.

The selection unit receives a condition required for compression processing of the processing target data, applies a plurality of compression processing settings applicable to the processing target data to evaluation data to perform compression processing, selects a setting that satisfies the condition when being applied to the processing target data from the plurality of compression processing settings on the basis of a result of the compression processing on the evaluation data, and manages the selected compression processing setting in association with the condition. when the condition is designated, the compression processing unit compresses the processing target data according to a compression processing setting managed in association with the condition.

The conditions required for the compression processing of the processing target data can include a use condition of compression by the user who uses compression, an evaluation image data set (the data set includes one piece of image data) capable of appropriately determining whether the compression is available by the analysis software, an error allowable by the analysis software, and the like.

The system selects a plurality of compression settings to be examined as "compression setting candidates" based on the conditions received from the user. In all the compression settings selected as the compression setting candidates, the evaluation image data set received from the user is compressed and expanded to generate the degradation evaluation image data set degraded in each compression setting.

The system continues to input the degradation evaluation image data set into the analysis software, perform analysis, and acquire an analysis result. Then, the optimum compression setting is grasped based on the analysis result. At this time, the compression setting is also notified to an edge device or the like that actually performs the compression processing.

These processes enable the disclosed system to allow the user to find available compression processing in a shorter time. Since the compression setting and the like are automatically performed, the workload of the user who uses the compression system can be reduced.

As the evaluation data, among data accumulated in the past, data used for the same usage as the processing target data may be used. As described above, by using data similar to the evaluation target data as the evaluation data, the compression setting can be evaluated according to the usage.

According to the data compression processing system of the disclosure, the device including the selection unit holds the correspondence relationship between the compression processing setting and the condition, and transmits and holds the correspondence relationship to the device including the compression processing unit to synchronize the correspondence relationship.

For this reason, for example, even in a case where the sensor server 102, the sensor, or the like performs the compression processing, it is possible to perform the compression suitable for the usage or the like.

According to the data compression processing system of the disclosure, the condition required for the compression processing of the processing target data is a condition set obtained by combining a plurality of conditions.

The condition set can include a limit on any of a compression rate, a write transfer time, and a read transfer time.

The condition set may include a matter for specifying any one of the usage of the processing target data and the classification of the contents of the processing target data.

As described above, by managing combinations of conditions, it is possible to pattern and easily manage conditions required for the compression processing.

According to the data compression processing system of the disclosure, the compression processing setting includes a combination of a plurality of compression systems.

Therefore, after the first compression is performed for the purpose of reducing the capacity in transmission and storage, decompression and recompression are performed, and data in a format suitable for analysis or the like can be obtained.

The compression processing setting may include information necessary for decompression.

Therefore, the compressed processing target data can be easily decompressed.

In the disclosed system, the compression processing setting uses an algorithm and/or learning data according to a usage.

For this reason, various compressions can be selectively used according to the usage.

The selection unit manages a data set type index that is identification information for identifying a condition required for the compression processing and a compression setting index that is identification information for identifying the selected compression processing setting in association with each other.

Therefore, if the user specifies the data set type index for the data to be processed, an appropriate compression processing setting can be specified.

In the disclosed system, the device including the selection unit and the device including the compression processing unit share in advance a plurality of compression processing settings applicable to the processing target data.

Therefore, a plurality of devices such as the storage node 100, the sensor server 102, and the analysis server 104 can perform compression/decompression on the basis of common data.

The disclosed method includes: a selection step of selecting a compression processing setting to be applied to processing target data from a plurality of compression processing settings; and a compression processing step of compressing the processing target data according to the compression processing setting selected in the selection step.

Therefore, before the compression of the processing target data, that is, the data to be processed at the time of operation is performed, the compression processing setting can be specified by the selection step.

Then, in the selection step, a condition required for compression processing of the processing target data is received, a plurality of compression processing settings applicable to the processing target data is applied to evaluation data to perform compression processing, a setting that satisfies the condition when being applied to the processing target data is selected from the plurality of compression processing settings on the basis of a result of the compression processing on the evaluation data, and the selected compression processing setting is managed in association with the condition. In the compression processing step, when the condition is designated, the processing target data is compressed according to a compression processing setting managed in association with the condition.

With these processes, it is possible to efficiently specify the compression processing setting suitable for the processing target data.

Further, the present invention is not limited to the above embodiments, and various modifications may be contained. For example, the above embodiments have been described in detail for easy understanding of the present invention, and the present invention is not necessarily limited to those having all the configurations described. The configuration is not limited to the deletion, and the configuration can be replaced or added.

What is claimed is:

1. A data compression processing system comprising:
   a selection unit configured to select a compression processing setting to be applied to processing target data from among a plurality of compression processing settings; and
   a compression processing unit configured to compress the processing target data according to the compression processing setting selected by the selection unit, wherein
   the selection unit is configured to:
   receive a condition required for compression processing of the processing target data;
   apply a plurality of compression processing settings applicable to the processing target data to evaluation data to perform compression processing;
   select, from the plurality of compression processing settings, a setting that satisfies the condition when applied to the processing target data based on a result of the compression processing for the evaluation data; and
   manage the selected compression processing setting in association with the condition, and
   the compression processing unit is configured to:
   compress, when the condition is designated, the processing target data according to a compression processing setting managed in association with the condition.

2. The data compression processing system according to claim 1, wherein
   the evaluation data is data used for a same usage as the processing target data among data accumulated in a past.

3. The data compression processing system according to claim 1, wherein
   a device including the selection unit holds a correspondence relationship between the compression processing setting and the condition, and transmits and holds the correspondence relationship to a device including the compression processing unit to synchronize the correspondence relationship.

4. The data compression processing system according to claim 1, wherein
a condition required for the compression processing of the processing target data is a condition set obtained by combining a plurality of conditions.

5. The data compression processing system according to claim 4, wherein
the condition set includes a limit on any of a compression rate, a write transfer time, and a read transfer time.

6. The data compression processing system according to claim 4, wherein
the condition set includes a matter for specifying any one of a usage of the processing target data and a classification of contents of the processing target data.

7. The data compression processing system according to claim 1, wherein
the compression processing setting includes a combination of a plurality of compression settings.

8. The data compression processing system according to claim 1, wherein
the compression processing setting includes information necessary for decompression.

9. The data compression processing system according to claim 1, wherein
the compression processing setting uses an algorithm and/or learning data according to a usage.

10. The data compression processing system according to claim 1, wherein
the selection unit manages identification information for identifying a condition required for the compression processing and identification information for identifying the selected compression processing setting in association with each other.

11. The data compression processing system according to claim 1, wherein
a device including the selection unit and a device including the compression processing unit share in advance a plurality of compression processing settings applicable to the processing target data.

12. A data compression processing method comprising:
selecting a compression processing setting to be applied to processing target data from among a plurality of compression processing settings; and
compressing the processing target data according to the compression processing setting selected in the selection step, wherein
the selecting includes:
receiving a condition required for compression processing of the processing target data;
applying a plurality of compression processing settings applicable to the processing target data to evaluation data to perform compression processing,
selecting, from the plurality of compression processing settings, a setting that satisfies the condition when applied to the processing target data based on a result of the compression processing for the evaluation data; and
managing the selected compression processing setting in association with the condition, and
the compressing includes:
compressing, when the condition is designated, the processing target data according to a compression processing setting managed in association with the condition.

* * * * *